Figure 3:
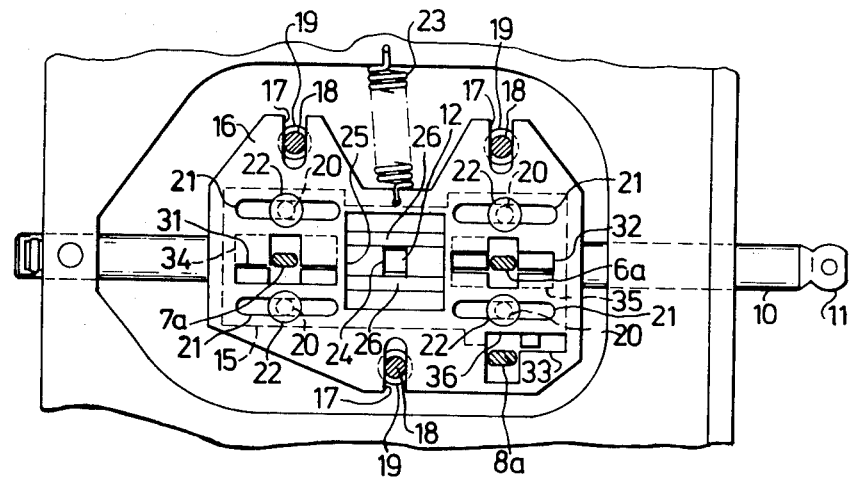

United States Patent [19]

Janiszewski

[11] 4,132,125
[45] Jan. 2, 1979

[54] SHIFT MECHANISM IN A MOTOR VEHICLE GEAR BOX

[75] Inventor: Gregor K. Janiszewski, Göteborg, Sweden

[73] Assignee: AB Volvo, Göteborg, Sweden

[21] Appl. No.: 808,695

[22] Filed: Jun. 21, 1977

[30] Foreign Application Priority Data

Jun. 30, 1976 [SE] Sweden ............................. 7607458

[51] Int. Cl.² .......................... G05G 5/10; G05G 9/14
[52] U.S. Cl. .................................... 74/477; 74/473 R
[58] Field of Search ................... 74/473 R, 475, 476, 74/477

[56] References Cited

U.S. PATENT DOCUMENTS

| 1,727,646 | 9/1929 | Hunt et al. | 74/477 |
| 2,098,708 | 11/1937 | Maker et al. | 74/473 |
| 2,240,995 | 5/1941 | Maier | 74/473 |

FOREIGN PATENT DOCUMENTS

| 607043 | 12/1934 | Fed. Rep. of Germany | 74/477 |
| 657322 | 3/1938 | Fed. Rep. of Germany | 74/477 |
| 855657 | 11/1952 | Fed. Rep. of Germany | 74/477 |

Primary Examiner—Allan D. Herrmann
Attorney, Agent, or Firm—Young & Thompson

[57] ABSTRACT

A shift mechanism in a motor vehicle gear box is described having on its output gear shaft freely rotatably journalled toothed gears which can be selectively locked to the shaft by means of at least two engaging sleeves axially displaceable on the shaft, said sleeves engaging individual shifting forks displaceable in the axial direction of the gear box. The shift mechanism cooperates with the forks so that, when a gear lever connected to the shift mechanism is shifted, it displaces the engaging sleeves and achieves selective locking of the toothed gears to the shaft. The shift mechanism has a shifting rod running in the axial direction of the gear box, onto which rod the forks are displaceably journalled, a shift plate displaceable parallel to and perpendicular to the shifting rod and a selector plate which is displaceable perpendicular to the shifting rod, either the shift plate or the selector plate being placed on top of the other and both being provided with at least two control openings or cavities which hold a portion of their respective fork and have such a shape that only one of the forks can be moved at a time by the shift plate, while the other forks are locked in a neutral position by the selector plate. The selection of the fork to be displaced is done by moving the shift plate and the selector plate perpendicular to the shifting rod.

6 Claims, 12 Drawing Figures

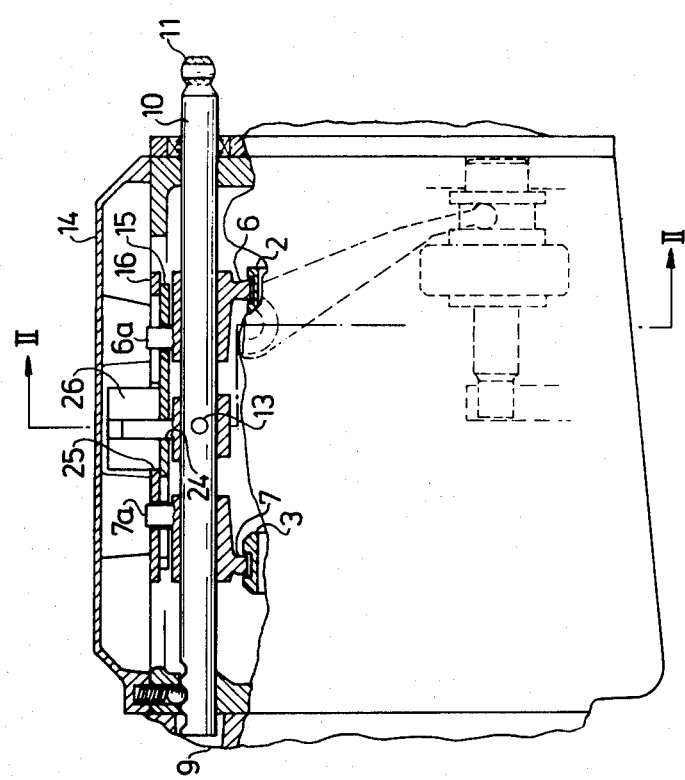
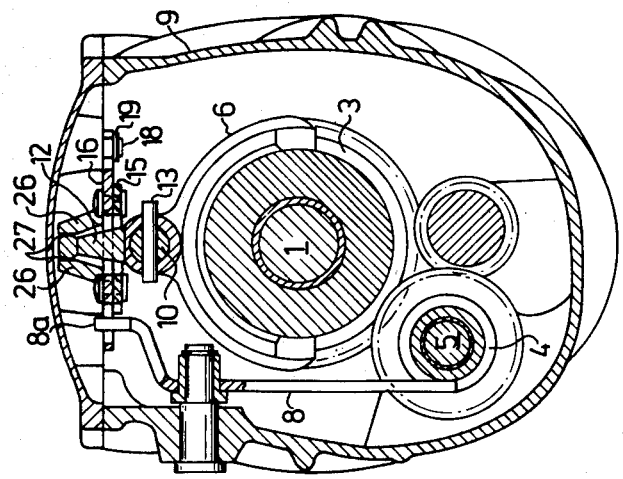
FIG. 1
FIG. 2

SHIFT MECHANISM IN A MOTOR VEHICLE GEAR BOX

The present invention relates to a shift mechanism in a motor vehicle gear box of the type which on its output gear shaft has freely rotatably journalled toothed gears which can be selectively locked to the shaft by means of two or more engaging sleeves axially displaceable on the shaft, said engaging sleeves engaging individual shifting forks displaceable in the axial direction of the gear box, and the shift mechanism cooperating with the forks so that, when a gear lever connected to the shift mechanism is shifted, it displaces the engaging sleeves and achieves selective locking of the toothed gears to the shaft. Known shift mechanisms in gear boxes of the above-mentioned type usually include a number of shift rods which are displaceable in the axial direction of the gear box and onto which the respective forks are fixed. The number of shifting rods depends on the number of gears in the gear box. The selection of the shifting rod to be displaced is done with the aid of a selector mechanism connected to the gear lever. The known constructions have numerous disadvantages. They include a large number of parts, causing high costs, complicated assembly and low shifting quality. A large number of friction surfaces results in stiffness in shifting. They also require space, which affects the height and width of the housing of the gear box.

The present invention aims to achieve a shift mechanism which, inter alia, is made up of few and inexpensive parts, is simple to assemble, and gives distinct shifting with reduced stiffness.

This is achieved according to the invention by means of a shift mechanism which has a shifting rod running in the axial direction of the gear box, onto which rod the forks are displaceably journalled, a shift plate which is disposed displaceable parallel to and perpendicular to the shifting rod, and a selector plate which is disposed displaceable perpendicular to the shifting rod, either the shift plate or the selector plate being placed on top of the other. Both are provided with at least two control openings or cavities which hold a portion of their respective fork and have such a shape that only one of the forks can be moved at a time by the shift plate while the other forks are locked in a neutral position by the selector plate, and that the selection of the fork which is to be displaced is done by moving the shift plate and the selector plate perpendicular to the shifting rod.

In addition to the above-mentioned advantages, this allows for a reduction of the dimensions of the gear box, consequently reducing its price also. The shift mechanism is easily adaptable to an unlimited number of transmissions and shift patterns merely by changing the number of control openings and their placement.

Figure 3A:
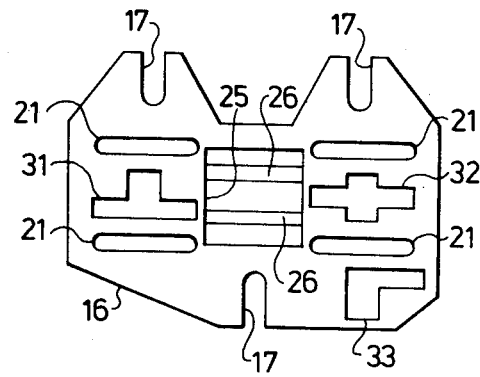
Figure 3B:
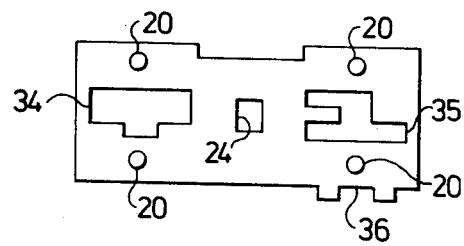
Figure 7:
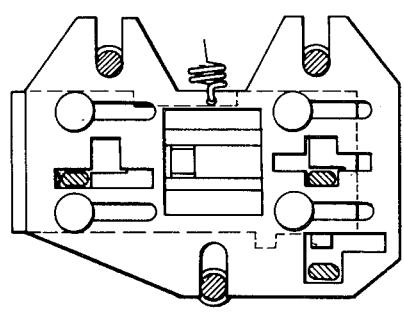
Figure 8:
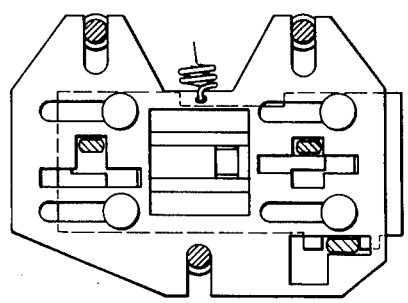
Figure 9:
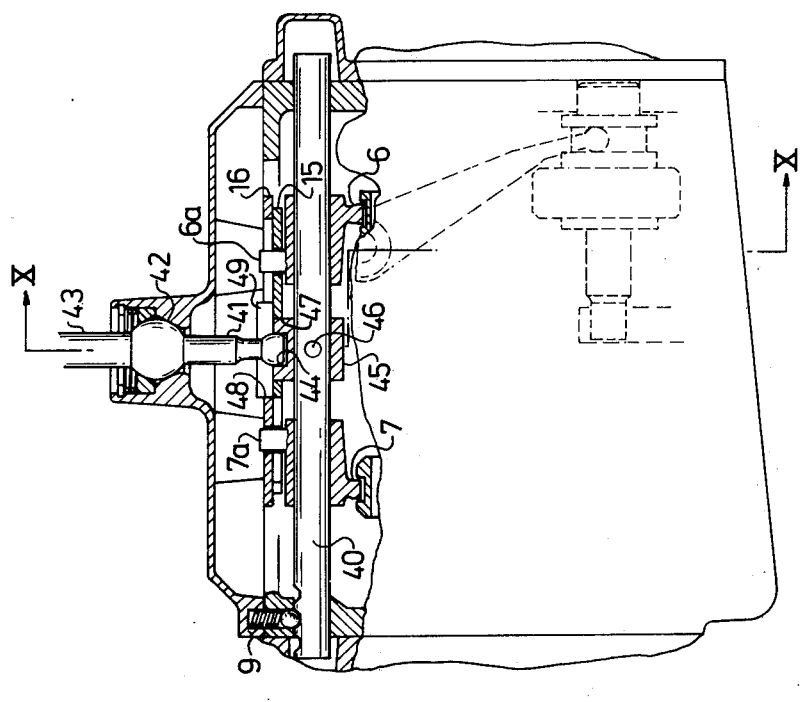
Figure 10:
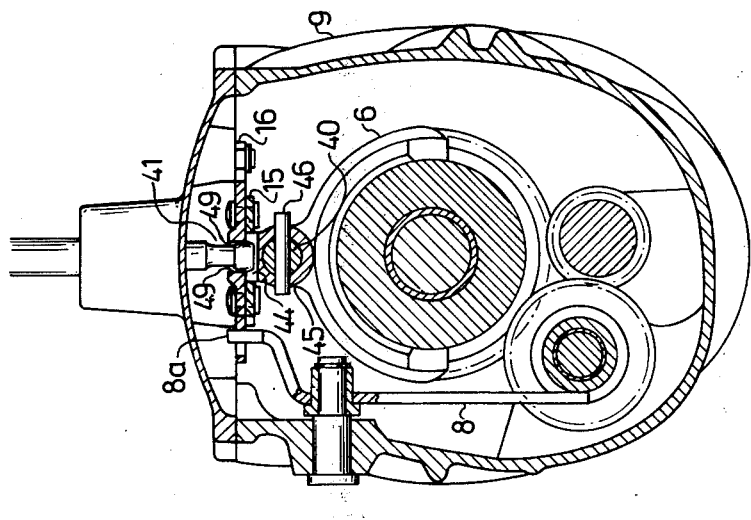

The invention will be described below with reference to the examples shown in the accompanying drawings, on which FIG. 1 shows a side view of a partially cut away four-speed vehicle gear box with a longitudinal section through an embodiment of a shifting mechanism according to the invention, FIG. 2 shows a section along the line II—II in FIG. 1, FIG. 3 shows a view from above of the shift system in FIG. 1 in the neutral position, FIG. 3a shows a view of the selector plate only, FIG. 3b shows a view of the shift plate only, FIGS. 4–8 give views corresponding to FIG. 3 illustrating the positions of the shift plate and the selector plate in the different gear positions, FIG. 9 shows a view corresponding to FIG. 1 of a modified embodiment of the shift mechanism, and FIG. 10 shows a section along the line X—X in FIG. 9.

The gear box shown in FIGS. 1 and 2 is of conventional type with four speeds forward and one in reverse. On its output shaft 1 it has freely rotatably journalled toothed wheels (not shown) for gears 1–3. By moving an engaging sleeve 2 with synchronizing means, the gear wheel for first and second gear can be alternatively locked onto the shaft 1 and by moving the corresponding engaging sleeve 3, the gear wheel for third gear can be locked onto the shaft 1 or, alternatively, the shaft 1 can be connected to the input shaft (not shown) in fourth gear. A third engaging sleeve 4 is displaceably journalled on an intermediate shaft 5 for locking the intermediate wheel of the reverse gear onto the shaft 5. The displacement of the engaging sleeves 2 and 3 is achieved in a conventional manner by moving shifting forks 6 and 7, respectively, which engage the respective sleeve, while displacement of engagement sleeve 4 is achieved by swinging a shifting lever 8 which is swingably journalled in the housing 9 of the gear box, with one end engaging the engaging sleeve 4.

According to the invention the forks 6 and 7 are displaceably journalled on a shifting rod 10 which is in turn, in the embodiment shown in FIGS. 1 and 2, displaceably and turnably journalled in the housing 9. The shift rod has an end part 11 extending outside the housing, intended to be operatively connected to a gear level (not shown) in such a manner that swinging the gear lever laterally produces a turning of the shifting rod 10, while swinging the lever longitudinally produces a sliding of the shifting rod 10. A shifting finger 12 is fixed to approximately the center of the rod 10 by means of a through pin 13.

Between the shifting rod 10 and the upper wall 14 of the gear box there is a lower plate 15, called the shift plate in the following, and an upper plate 16, called the selector plate in the following. The latter has, as is most clearly seen in FIG. 3, three parallel notches 17 on two opposing sides. Pins 18 extend into the notches 17 from the upper wall 14 of the housing. These pins 18 have washers 19 on them on the underside of the selector plate 16. Via this arrangement, the selector plate 16 is displaceable a short distance transversely to the housing 9. The shift plate 15 has four pins 20 sticking up and engaging individual oblong openings 21 in the selector plate and have heads 22 on the top side of the selector plate 16. The openings 21 extend parallel to the shifting rod 10 so that the shift plate is displaceable relative to the selector plate in this direction. Due to the engagement of the pins 20 in the openings 21, the shift plate is also displaceable transversely together with the selector plate. A spring 23 between the selector plate 16 and the housing 9 loads the former to one side.

The shift plate 15 and the selector plate 16 also have individual central openings 24 and 25 respectively, through which the shifting finger 12 extends. The length of the opening 24 in the longitudinal direction of the shifting rod 10 approximately corresponds to the dimension of the shifting finger, while the opening 25 is approximately as long as the openings 21. On both sides of the opening 25 there are stops 26 which at their outer ends form stop surfaces 27 for the outer end of the shifting finger 12. By turning the shifting rod 10, the selector plate 16 can be displaced with the shift plate 15, via the shifting finger 12 and the stops 26, relative to the housing in its transverse direction, and by displacing the shifting rod the shift plate can be displaced, via the shifting finger, relative to the selector plate in the longitudinal direction of the housing.

In the selector plate 16 there are three control openings 31, 32 and 33 with different shapes, and in the shift plate 15 there are two control openings 34 and 35 and a notch 36, also with different shapes (see FIGS. 3a and 3b). The openings 31,32 and 34,35 respectively in the selector plate 16 and in the shift plate 15 respectively are so shaped and placed that they always have an overlapping portion into which an extending part 7a of the fork 7 and an extending part 6a of the fork 6, respectively, penetrate. The end 8a of the shifting lever 8 penetrates into the opening 33, and in certain cases also engages the notch 36 as will be described below.

FIG. 3 shows the forks 6,7 and the lever 8 in the neutral position, the selector plate 16 and the shift plate 15 being positioned for shifting into either first or second. The gear lever, for a normal "H" shift pattern, is pressed to the left as seen from the driver's seat since the selector plate, and with it the gear lever, is normally held by a spring 23 in the neutral position between third and fourth.

Figure 4:
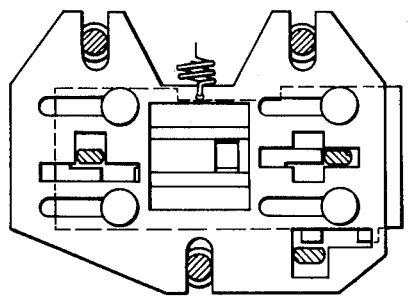

In shifting from the neutral position in FIG. 3 into first gear, shown in FIG. 4, the fork 6 is pushed to the right in the figure by an edge of the opening 35 in the shift plate 15. At the same time the fork 7 is unaffected by the displacement of the shift plate, since the shape of the opening 34 permits this displacement without any edge of the same acting on the fork 7. Instead this fork is locked in by the selector plate 16 in its opening 31.

Figure 5:
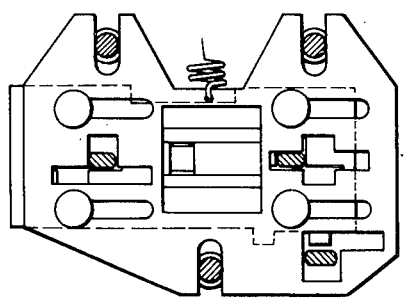

In FIG. 5 second gear is engaged. The fork 6 has been pushed to its left-hand end position in the figure by an edge of the opening 35. Fork 7 is still locked in opening 31 in the selector plate.

Figure 6:
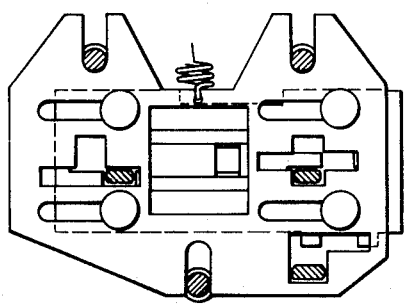

In shifting from second to third, as shown in FIG. 6, the selector plate 16 and the shift plate 15 are first moved into the neutral position. They are then moved upwards and then to the right as seen in FIG. 6. This first locks fork 6 into opening 32 in the selector plate, and then fork 7 is moved to the right in the figure by the edge of the opening 34.

In FIG. 7 fourth gear is engaged. The fork 7 has been moved to its left end position by an edge of the opening 34. Fork 6 is still locked into opening 32 in the selector plate.

In all of the gear positions described above, the reverse gear lever 8 is locked into opening 33 in the selector plate and it never engages the notch 36 in the shift plate.

When reverse gear is engaged, the selector plate 16 is moved from the neutral position to the position shown in FIG. 8. This locks forks 6 and 7 into openings 32 and 31 at the same time as the lever 8 is moved into the notch 36 of the shift plate. When the shift plate is then moved to the right in the figure, the lever end 8a is also moved to the right and the reverse gear is engaged.

The displacement of the selector plate 16 and the shift plate 15 is achieved, as was described earlier, by turning and sliding the shifting rod 10, in the embodiment of the invention shown in FIGS. 1-8.

FIGS. 9 and 10 show an alternative embodiment of a shift mechanism which differs from that described above in that a shifting rod 40 is arranged which only need be displaceable in the housing 9 of the gear box. Here the shifting finger is an extension 41 of a gear lever 43 journalled in a ball joint 42. The outer end of the shifting finger 41 engages a transverse groove 44 in a member 45, which by means of a pin 46 is securely joined to the shifting rod 40. The member 45 engages in an opening 47 in the shift plate 15. The selector plate 16 has a long opening 48 into which the outer end of the shifting finger 41 extends. Along the long side of the opening 48 there are stop surfaces 49 for the shifting finger.

The displacement of the selector plate 16 is achieved by swinging the shifting finger 41 transversely to the gear box so that the outer end of the finger cooperates with one of the stop surfaces 49. Displacement of the shift plate is achieved by swinging the finger 41 in the axial direction of the gear box so that the outer end of the finger cooperates with one edge of the groove 44 depending on the displacement. Otherwise, the functioning and construction is the same as described above in connection with FIGS. 1-8.

What I claim is:

1. In a motor vehicle gear box having an output gear shaft, toothed gears freely rotatably journalled on said shaft, shift mechanism comprising at least two engaging sleeves axially displaceable on the shaft for selectively locking said gears to said shaft, individual shifting forks displaceable in the axial direction of the gear box for axially displacing said sleeves on said shafts, whereby when a gear lever connected to the forks of the shift mechanism is shifted, the forks displace the engaging sleeves to achieve selective locking of the toothed gears to the shaft; the improvement comprising a shifting rod (10; 40) running in the axial direction of the gear box, onto which rod the forks (6,7) are displaceably journalled, a shift plate (15) which is displaceable parallel to and perpendicular to the shifting rod, and a selector plate (16) which is displaceable perpendicular to the shifting rod, the shift plate and the selector plate being superposed and both being provided with at least two control openings (31,32 and 34,35 respectively) which hold a portion (6a,7a) of their respective fork and have such a shape that only one of the forks can be moved at a time by the shift plate while the other forks are locked in a neutral position by the selector plate, and that the selection of the fork which is to be displaced is done by moving the shift plate and the selector plate perpendicular to the shifting rod.

2. Shift mechanism according to claim 1, characterized in that the selector plate (16) is displaceably journalled in the housing (9) of the gear box and has oblong openings (21) running in the longitudinal direction of the shifting rod (10; 40), that the shift plate (15) is displaceably journalled on the selector plate by means of pins (20) engaging said openings, and that a shifting finger (12; 41) engaging the selector plate and the shift plate is arranged which is operatively connected to the gear lever of the gear box to displace the selector plate relative to the housing and the shift plate relative to the selector plate depending on the movement of the gear lever.

3. Shift mechanism according to claim 2, characterized in that the shifting rod (10) is turnably and displaceably journalled in the housing of the gear box, that the shifting finger (12) is securely joined to the shifting rod and extends through an opening (24 and 25 respectively) in the shift plate (15) and the selector plate (16), that the opening (25) in the selector plate has a larger dimension in the longitudinal direction of the shifting rods than the opening (24) in the shift plate to produce displacement of the shift plate relative to the selector plate when the shifting finger is displaced with the shifting rod, and that the selector plate has, at a distance above its upper surface, stop surfaces (27) running parallel with the shifting rod for the shifting finger on both sides of the same to produce displacement of the selector plate when the shifting rod is turned.

4. Shift mechanism according to claim 2, characterized in that the shifting rod (40) is displaceably journalled in the housing of the gear box, that the shifting finger (41), which is swingably journalled in the housing by means of a ball joint (42), penetrates down through an opening (48) in the selector plate (16) and engages with its outer end a groove (44) running transversely to the shifting rod in a member (45) securely attached to the shifting rod, which member engages an opening (47) in the shift plate, that the opening in the selector plate has such a dimension in the longitudinal direction of the shifting rod that the shift plate is displaceable relative to the selector plate when the shifting finger is swung parallel to the shifting rod, and that the longitudinal side edges of the opening (48) in the selector plate form stop surfaces (49) for the shifting finger to produce displacement of the selector plate when the shifting finger is swung transversely to the shifting rod.

5. Shift mechanism according to claim 1 in a gear box with four speeds forward and one in reverse, characterized in that the selector plate (16) has a first control opening (32) for a first fork (6) arranged to displace an engaging sleeve (2) on the output shaft (1) for shifting between first and second gear, a second control opening (31) for a second fork (7) arranged to displace an engaging sleeve (3) on the output shaft (1) for shifting between third and fourth gear, and a third control opening (33) for a shifting lever (8) arranged to displace an engaging sleeve (4) on an intermediate shaft (5) for shifting between the neutral position and reverse gear, and that the shift plate (15) has first and second control openings (35,34) for the first and second forks and a control opening or notch (36) for the lever.

6. Shift mechanism according to claim 1, characterized in that the selector plate (16) is spring loaded to one side of the shifting rod (10; 40).

* * * * *